United States Patent [19]
Richardson

[11] 3,742,349
[45] June 26, 1973

[54] METHOD AND APPARATUS FOR QUANTITATIVELY EVALUATING INTEGRITY OF WINDING INSULATION

[75] Inventor: Hugh H. Richardson, New Haven, Ind.

[73] Assignee: General Electric Company, Fort Wayne, Ind.

[22] Filed: May 6, 1971

[21] Appl. No.: 140,914

[52] U.S. Cl. .............................................. 324/54
[51] Int. Cl. ............................................ G01r 31/12
[58] Field of Search ..................................... 324/54

[56] References Cited
UNITED STATES PATENTS

| 3,286,130 | 11/1966 | Clinton | 324/54 |
| 1,983,665 | 12/1934 | Hickok | 324/54 X |
| 2,170,813 | 8/1939 | Doble et al. | 324/54 |
| 2,329,098 | 9/1943 | Browning et al. | 324/54 |
| 2,923,879 | 2/1960 | Povey | 324/54 |
| 3,015,774 | 1/1962 | Eigen | 324/54 |
| 3,096,478 | 7/1963 | Brown | 324/54 |

Primary Examiner—Gerard R. Strecker
Attorney—John M. Stoudt, Ralph E. Krisher, Jr., Radford M. Reams and Joseph B. Forman

[57] ABSTRACT

Method and apparatus for obtaining an indication of the overall integrity of an electrically insulative material supported on an electrical conductor which in turn may be accommodated on an electrically conductive structure such as a magnetic core. The conductor and conductor accommodating structure are preferably completely surrounded by a conductive fluid, e.g., tap water; a preselected voltage is applied across the conductor and fluid; and the resistive and capacitive components of current flowing through the conductor and fluid are then determined and compared, preferably by determining the relationship of one current component to the other current component. This relationship is referred to herein as the "DF" or dissipation factor, and is indicative of the overall integrity and insulating quality of the electrically insulative covering.

10 Claims, 5 Drawing Figures

Inventor:
Hugh H. Richardson,
By Ralph E. Krisher Jr.
Attorney.

METHOD AND APPARATUS FOR QUANTITATIVELY EVALUATING INTEGRITY OF WINDING INSULATION

BACKGROUND OF THE INVENTION

The present invention relates to methods and apparatus for indicating the integrity or insulating quality of an insulation coating on an electrical conductor, and, more particularly, to methods and apparatus for indicating the magnitude of insulation defects or damage of insulated windings accommodated on a magnetic core, e.g., a core of a dynamoelectric machine.

Prior procedures for testing the quality of an insulative coating may be categorized as either destructive or nondestructive. As used herein, destructive testing procedures are meant to be those which inherently may have a deleterious effect on an insulative coating. It will be understood that this type of procedure is not as desirable as a nondestructive procedure whereby the complete output of a given production line may be tested without damaging those tested devices that exhibit satisfactory test characteristics. However, prior nondestructive approaches have not been as satisfactory as would be desired from the standpoint of accuracy and consistency in results. Furthermore, the prior techniques have not been sufficiently consistent and readily adaptable for use in detecting the deleterious effects that different manufacturing steps may have during the manufacture of a single given structure that includes one or more insulated conductors.

For example, in the manufacture of motors, it would be desirable to provide methods and apparatus whereby the overall insulation integrity for one or more windings accommodated on a magnetic rotor or stator core could be determined, with a satisfactory level of confidence, after each separate manufacturing step. It will be appreciated that with such methods and apparatus, one would more desirably be able to determine whether a given piece of manufacturing equipment or a given manufacturing process was deleteriously affecting the winding insulation and, if so, the relative extent of such damage. To be more specific, one known motor stator manufacturing process involves generating winding coils of insulated magnet wire; placing the coils in slots of the stator; pressing at least some of the coils so placed into a more compact volume; forming or pressing the end turns of the coils into a desired configuration; placing other winding coils in a common stator slot with the previously compacted coils; pressing or forming the end turns of these other winding coils; and varnish impregnating the windings. Although these steps are not all inclusive, are not necessarily in sequence, and may be omitted in part, it will be appreciated that the integrity of the winding insulation may be affected during any one or more of the individual steps. In addition, damage may be done during a plurality of successive steps and have a cumulative deleterious effect on the quality or integrity of the winding insulation.

Prior procedures for nondestructively testing insulation coatings have ranged from measuring the winding resistance from which the insulation integrity may be deduced; to immersing an insulated conductor in an acidic electrolyte bath, applying a direct current to the insulated conductor, and observing the evolution of hydrogen gas from the bath because of unsatisfactory insulation on the conductor.

Still other procedures have included applying a high voltage direct current between the conductor and a frame (such as a stator core) and attempting to accurately measure the current flowing therebetween.

All of the prior approaches of which I am aware have been more qualitative than quantitative in nature. In other words, the prior approaches are generally susceptible of use for determining whether a particular structure being tested exhibits insulating characteristics that are either acceptable or not acceptable. However, it would be more desirable to be able to ascertain, at least relatively, the degree or amount of change in insulation integrity for a given structure and to be able to establish a relationship between such change and specific manufacturing operations and/or pieces of manufacturing apparatus. Moreover, it would be desirable to provide some means by which the insulation quality of one winding could be rationally compared with that of another winding even in those cases where different lengths, diameters, and winding coil shapes were involved.

Surge testing and high potential testing are two test procedures that have been used heretofore for testing winding insulation quality. In one type of surge test for motor stator windings, a current is surged through primary and auxiliary winding sections of the windings. While this test appears to give a reliable indication of insulation breaks between the two winding sections, the test has not been completely satisfactory for indicating insulation faults or damage in each individual winding section or for indicating the overall condition of the winding insulation. On the other hand, in a high potential test wherein a voltage of about 1800 to 2000 volts is applied between a stator core and winding, the presence of a damaged winding insulation region, remote from the stator core, is not as discernible as damaged insulation regions which are more proximately disposed to the core.

Thus, it would be desirable to provide a method and apparatus for consistently and reliably indicating overall winding insulation damage for individual winding sections which is not dependent on the proximity of damaged insulation regions to the core. It will also be understood that it would be desirable to provide methods and apparatus for quantitatively relating the overall quality of insulation on a winding with the total length and/or diameter of conductor used to form that winding, it being appreciated that a given number of insulation faults in a very short length of winding would tend to be, in general, much less tolerable than if the same faults were distributed over a very long length of conductor.

Accordingly, it is a general object of the present invention to provide new and improved methods and apparatus that may be utilized to attain the desirable results discussed above and to overcome deficiencies of prior approaches.

It is another object of the present invention to provide apparatus and methods for indicating the overall quality or integrity of an insulation coating on one or more windings.

It is a further object of the present invention to provide apparatus and methods for quantitatively determining the insulating quality of an insulation coating on an electrical conductor.

It is yet another object of the present invention to provide apparatus and methods for determining the relation between damaged insulation regions on an insulated conductor and the total surface area of the insulated conductor in order to provide a quantitatively meaningful indication of the quality of the insulation on the conductor.

A more specific object of the invention is to provide apparatus and methods for determining the insulating quality or integrity of an insulation coating on a conductor and which are particularly suitable for use in determining insulation damage caused by various manufacturing processes and apparatus to which the conductor is exposed.

SUMMARY OF THE INVENTION

In accordance with one form of the invention, there is provided an improved method and apparatus whereby the quality and integrity of an insulated conductor supported on a magnetic core is determined. The insulated conductor is submerged in an electrically conductive fluid and a voltage source is connected across the conductor and fluid, so that the resistive and capacitive components of current flowing through the windings and fluid are determinable. The resistive component is treated as being fundamentally related to the total exposed conductor area resulting from scratches, nicks, or voids in the insulation coating; and the capacitive component is treated as being fundamentally related to the total surface area of the insulated conductor which in turn is a function of the diameter of the coated conductor (in the case of round conductor) and the length of conductor. A comparison of these two current components then gives a quantitative indication of the quality and integrity of the insulation on the conductor.

In one preferred form, the resistive and capacitive components of the current are compared by dividing one by the other, i.e., establishing the ratio of one to the other. This ratio, which is identified herein as the dissipation factor ("DF") for the tested device, then may be utilized as a basis for comparing changes in a given conductor or for comparing the quality of insulation for conductors having various lengths as well as various cross-sectional sizes or configurations. Moreover, with respect to changes in characteristics of an insulated conductor as a result of various manufacturing operations, the dissipation factor appears to provide a more meaningful and accurate indication of such changes than heretofore. Apparatus exemplifying the invention in a preferred form includes means for determining the resistive and capacitive components of current flowing through a fluid and means for compensating or calibrating the apparatus so that changes in the fluid, e.g., impurity content, or the use of different fluids, will not destroy the accuracy of the apparatus.

In the practice of a preferred form of my method, after one or more compensated components of current are obtained, the resistive component of current is compared to the capacitive component of current by taking the ratio of one to the other, e.g., by dividing the resistive current component by the capacitive component to yield a dissipation factor ("DF") which is at least approximately analogous to an indication of the amount of damaged winding insulation per unit area of tested conductor. In apparatus embodying the preferred form of the invention, the comparison of the current components is accomplished by circuit means that produce a dissipation factor output signal which may be used to drive a digital or dial type meter from which dissipation factor may be read directly or which may be used with other suitable signal conversion means.

BRIEF DESCRIPTION OF THE DRAWINGS

The subject matter which I regard as my invention is particularly pointed out and distinctly claimed in the concluding portion of the specification. The invention itself, however, taken with further objects and advantages thereof, may be best understood by reference to the following description taken in conjunction with the accompanying drawings in which:

DESCRIPTION OF THE PREFERRED EMBODIMENT

Figure 1:
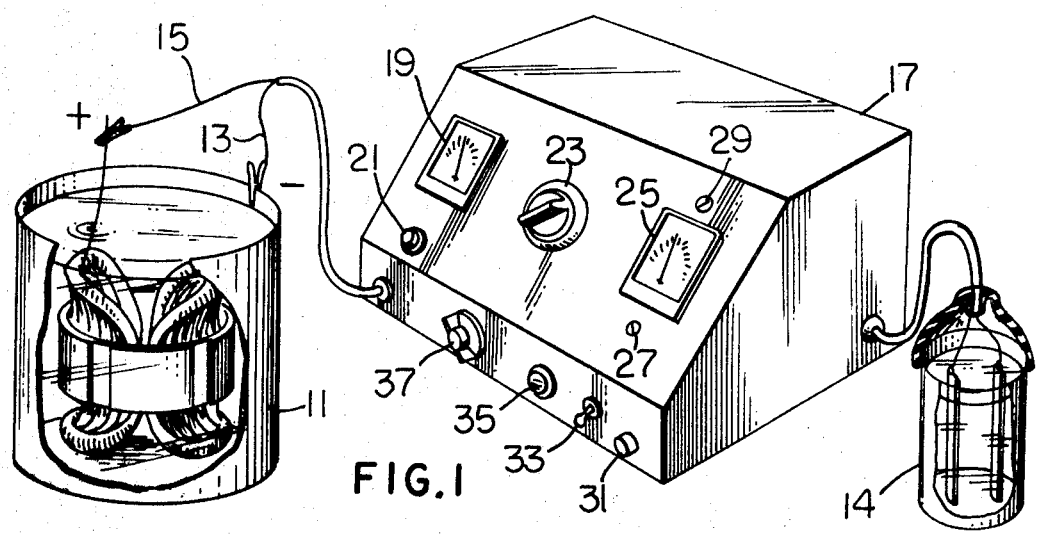
FIG. 1 is a perspective view of apparatus embodying, and which may be used to practice, the present invention in a preferred form.

With reference to FIG. 1, there is shown a sample tank 11 which is filled with a fluid to a depth sufficient to completely immerse the stator to be tested. Various fluids may be used, such as mercury, or other low melting point metals or alloys such as low melting point solders, and glycerol or glycol based solutions and mixtures to name but a few. I have found, however, that it is both economical and practical to utilize tap water as the fluid in tank 11, since tap water is readily available and has a sufficiently low surface tension to thoroughly impregnate most tightly wound coils. In FIG. 1, one test lead 13 is connected to the sample tank 11 which may be formed of a conductive material such as aluminum or steel. In the alternative, the lead 13 may be connected to an electrode suspended in the water while the other test lead 15 is to be connected to a lead from the insulated winding or windings to be tested. A sample of the same fluid used in the tank 11 is placed in the container 14 and the conductivity characteristics obtained from this sample are used to compensate or calibrate the apparatus 17. The apparatus 17 has an ammeter 19 for set up and calibration procedures, a test switch 21, a rotary selector switch 23, a dissipation factor meter 25, and fine and course zero adjustment potentiometers 27 and 29, the functions of which will appear more clearly from the detailed discussion of FIG. 4. The lower panel on the test unit 17 contains the usual power source controls and indicators, such as a fuse receptacle 31, an on/off switch 33, a pilot light 35 and a control 37 for varying the voltage across leads 13 and 15. Like reference numerals have been used in FIG. 1 and FIG. 4 for like parts to facilitate understanding the disclosure.

Figure 2:
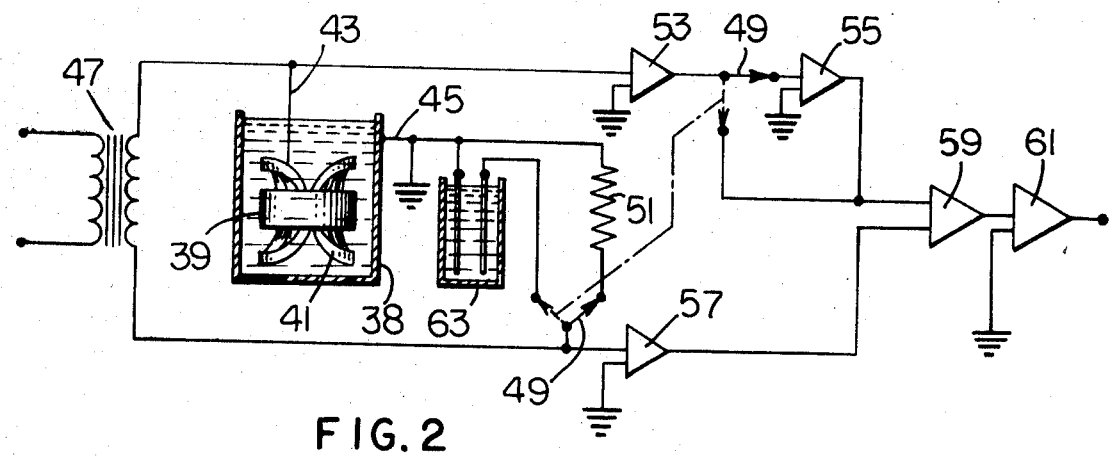
FIG. 2 is a simplified schematic diagram of a circuit that may be utilized in simplified apparatus embodying the invention.

Considering now FIG. 2, a sample tank 38 containing water and an immersed stator 39 having an insulated winding 41 to be tested are connected to test leads 43 and 45 as described above. A source of voltage 47 supplies a time varying voltage of about 25 volts rms. Assume first that the switch 49 is in the position to connect to resistor 51 and therefore that the other portion of this switch is coupling the output of operational amplifier 53 to the input of operational amplifier 55. In this case, there will be measured the capacitive component of the current flowing through the winding 41, the water, and the sample tank 38. The path of this current referred to as capacitive leakage current, is through the insulation on the winding 41 since the insulation forms a dielectric between two "plates" of a capacitor, the plates being the internal conductor of the winding 41 and the water surrounding the insulation. Under these circumstances, the input to the operational amplifier 57 is the voltage drop occurring across the resistor 51 which is proportional to the leakage current through the winding 41. On the other hand, the input to the operational amplifier 53 is the voltage actually applied to the sample. With the switch 49 in its capacitive component measuring position, the output of amplifier 53 is fed directly to operational amplifier 55 which performs the function of shifting an applied input signal by 90°. The output signals of the amplifiers 55 and 57 are then multiplicatively combined by yet another operational amplifier 59 and this combined output is in turn integrated by the operational amplifier 61 to provide an output signal indicative of the capacitive leakage current.

In FIG. 2, assume that the time varying instantaneous voltage between test leads 43 and 45 during each cycle of applied voltage is $e_s = E \sin wt$, where $e_s$ is the instantaneous voltage across the leads 43 and 45, E is the maximum or peak value of applied voltage, w is $2\pi$ times the frequency of the applied voltage (radians per second), and $t$ is time in seconds. Further assume that the stator winding and its associated leakage currents may be viewed as a simple parallel R-C circuit having resistance $R_s$ and capacitance $C_s$. Under these assumptions, the total instantaneous stator leakage current $i_t$ flows through the resistor 51 with a resistance of $R_1$ and is: $i_t = E/R_s \sin wt + C_s wE \cos wt$; and the output of amplifier 57 is then proportional to $(R_1 E/R_s) \sin wt + R_1 C_s wE \cos wt$. Thus, the output of amplifier 57 is proportional to $i_t$ and would be $G_{57} R_1 i_t$, where $G_{57}$ is the gain of amplifier 57. The output of amplifier 53 is $G_{53} E \sin wt$ where $G_{53}$ is the gain of amplifier 53. The output of phase shift amplifier 55 is $G_{53} E \cos wt$ with the gain of 55 being set to be equal to one; and the multiplicative operational amplifier 59 has an output of: $(G_{53} E \cos wt)$ $(G_{57} R_1 i_t)$ which is proportional to the reactive power in volt-amperes reactive (var) of the sample in tank 38. Integration by operational amplifier 61 gives a DC output to a not shown meter which is proportional to the capacitive component of leakage current $i_c$ flowing through the sample.

Moving the switch 49 to the position for measuring the resistive component of leakage current $i_R$ yields a circuit amenable to a similar analysis. The output from aplifier 53 is $G_{53} E \sin wt$ where $G_{53}$ is the gain of amp 53. The leakage current flows through the cell 63 with a resistance $R_{cc}$. In this case, the output of multiplier 59 will be $(G_{53} E \sin wt)$ $(G_{57} R_{cc} i_t)$ which will be proportional to the instantaneous power, in watts, in the sample. In this case, the output of multiplier 59 is compensated to take into consideration the conductivity of the fluid in the conductivity cell 63. Thus, the input to integrator 61 will be compensated for the conductivity or resistivity of the fluid in tank 38. The output of integrator 61 will then be a DC signal, proportional to the resistive leakage current $i_R$ flowing through the sample, which may be connected to a suitable meter. If the output derived when the switch is in the position for measuring the resistive component of current is divided by the output obtained when the switch is in position to measure the capacitive component of current, the quotient is the ratio of the resistive component of leakage current to the capacitive component of leakage current. Before proceeding to a discussion of the circuitry of FIG. 4 which electronically performs this division step and also eliminates the need for the manually operated switch 49 of FIG. 2, some of the principles involved in the above analysis of the capacitive and resistive components of leakage current will be again presented in connection with the circuit illustrated in FIG. 3.

Figure 3:
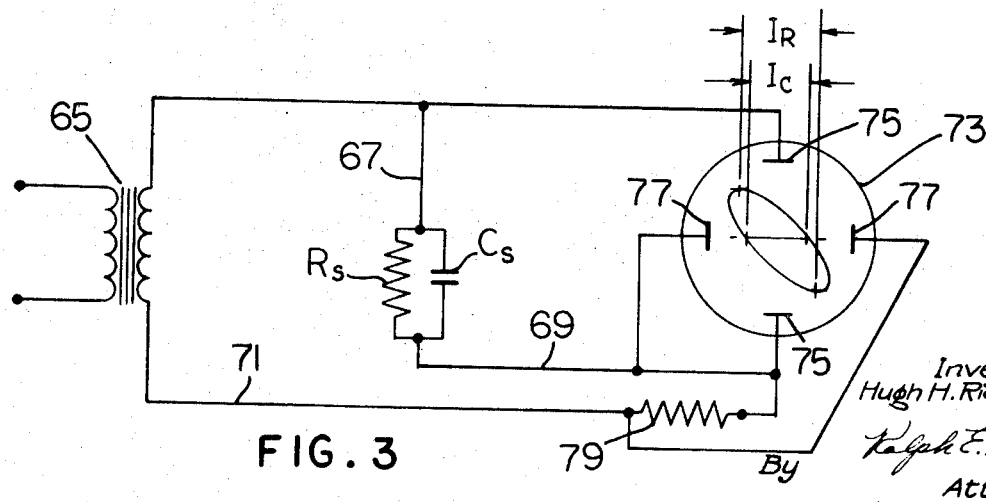
FIG. 3 is a schematic diagram illustrating another approach for practicing the invention.

FIG. 3 schematically illustrates a cathode ray tube 73, such as in a standard oscilloscope, preferably having a grid thereon for measuring the magnitudes of vertical and horizontal displacement which are, of course, generated by the vertical deflection plates 75 and the horizontal deflection plates 77 in the tube. A source of input voltage 65 supplies a time-varying voltage to the sample to be tested. The test sample may be an immersed stator winding as discussed above and is represented as a parallel resistance capacitance combination between the test leads 67 and 69. Of course, when more than one winding is to be tested, connections could be made to either winding and the conducting medium. For the test situation described, the stator may, if desired, be immersed in water to obtain a better approximation of the leakage current.

Considering the simple two terminal test shown in FIG. 3, when the voltage applied to the vertical deflection plates 75 is 0 the voltage across $R_s$ is 0 as is the voltage across the capacitance $C_s$, however, the current flowing in $C_s$ is at its maximum value. This current flowing in $C_s$ causes an IR drop in the resistor 79 and this voltage drop is, of course, that appearing across the horizontal deflection plates 77. Thus, by properly scaling the grid on the cathode ray tube face the value of the capacitive component of current may be read directly between those two points having no vertical deflection. Similarly, when the deflection voltage applied to the vertical plates 75 is a maximum, the current in the capacitor is 0 and that in the resistance $R_s$ is at its maximum value. Again this current is measured as an IR drop across the resistor 79 and applied to the horizontal deflection plates 77. Thus, to measure the resistive component of current on the cathode ray tube face, the horizontal distance between the maximum and minimum points of deflection in the vertical direction are measured. Having measured these values on the cathode ray tube, it is then a simple matter to divide the resistive component of current by the capacitive component of current and obtain the dissipation factor. This is, of course, analogous to obtaining the dissipation factor using the embodiment of FIG. 2 and forming the quotient of the two different outputs of the amplifier 61.

Figure 4:
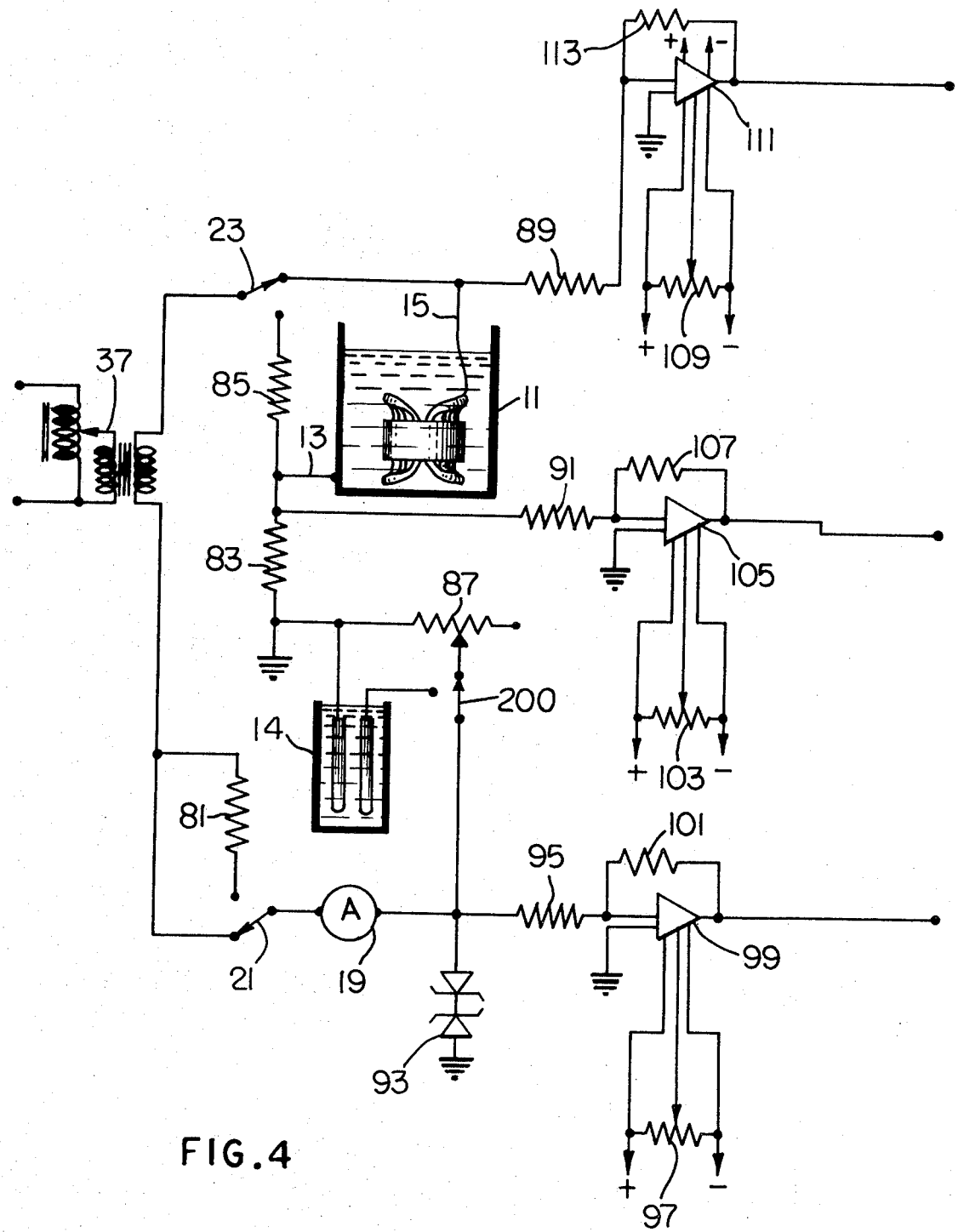
FIGS. 4 and 5 taken together with FIG. 4 to the left and FIG. 5 to the right form a schematic diagram of the circuitry of the apparatus shown in FIG. 1.
Figure 5:
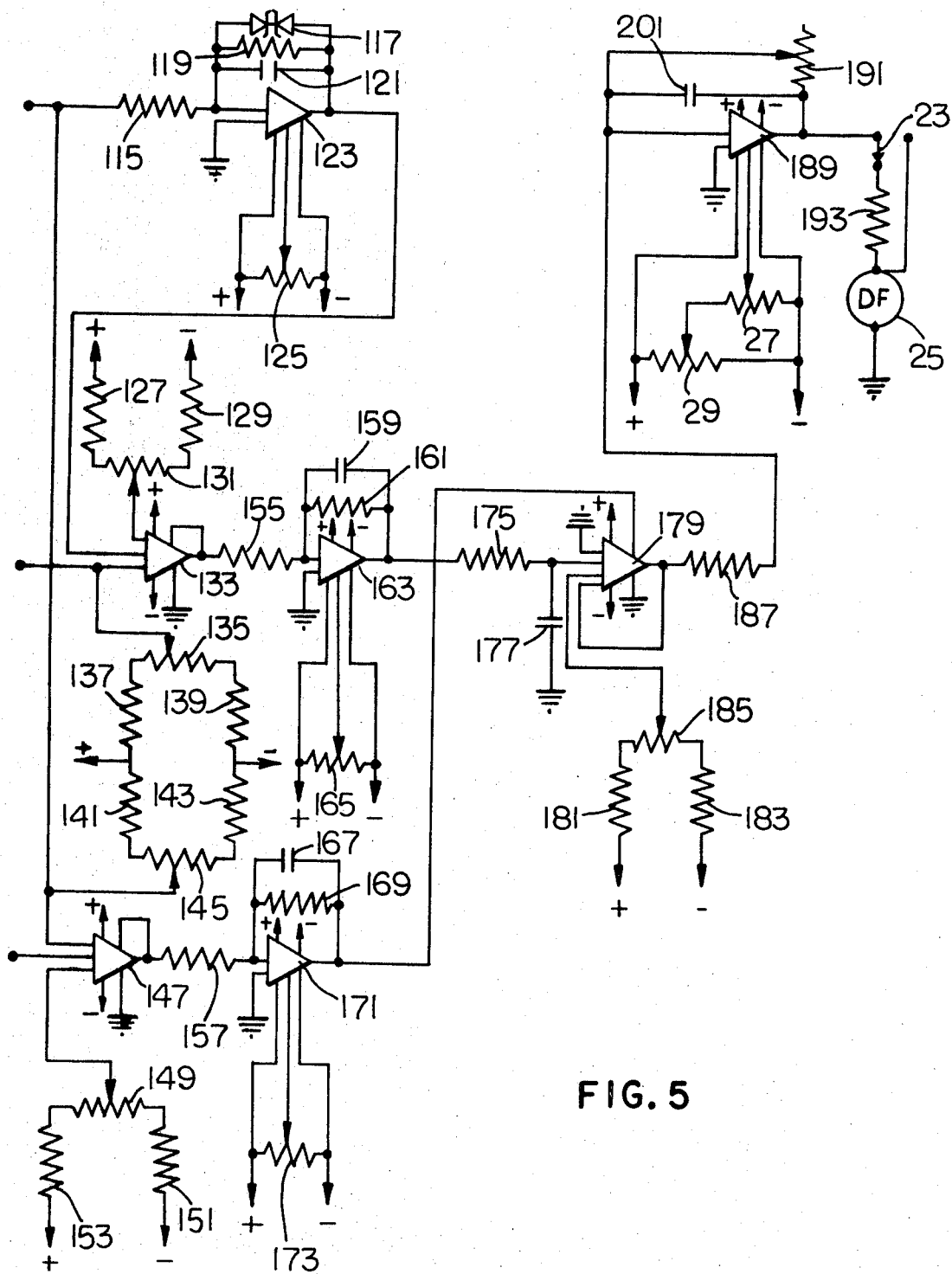

FIGS. 4 and 5 when joined together show a detailed schematic diagram of the elements which may be present in the apparatus shown in FIG. 1, however, before proceeding with an analysis of the schematic diagram of FIGS. 4 and 5, a tabulation of the circuit elements present will be provided for completeness of the description by listing the reference numeral and a very brief description of the element involved.

| Reference Numeral | Description |
| --- | --- |
| 19 | 0-25 milliampere alternating current ammeter, Triplett model 430 |
| 21 | Double pole single throw switch |
| 23 | Multiple position gang switch |
| 25 | 0-100 millivolt volt meter, Triplett model 420 |
| 27 | 50K ohm variable potentiometer |
| 29 | 2K ohm variable potentiometer |
| 37 | Nominal 25 volt rms voltage source, e.g., a variable autotransformer such as the "VOLT-PAC" transformer manufactured by the General Electric Company |
| 81 | 780 ohm resistor |
| 83 | 30 ohm resistor |
| 85 | 25K ohm resistor |
| 87 | Variable resistance such as a "decade box" |
| 89 | 1 megohm resistor |
| 91 | 15K ohm resistor |
| 93 | A pair of back-to-back Zener diodes establishing ±9.1 volt limits, e.g., a pair of type 1N4739A's |
| 95 | 15K ohm resistor |
| 97 | 100K ohm variable potentiometer |
| 99 | *Type 3195/15 operational amplifier |
| 101 | 100K ohm resistor |
| 103 | 100K ohm variable potentiometer |
| 105 | *Type 3195/15 operational amplifier |
| 107 | 100K ohm resistor |
| 109 | 2K ohm variable potentiometer |
| 113 | 200K ohm resistor |
| 115 | 40K ohm resistor |
| 117 | A pair of back-to-back Zener diodes establishing ±7.5 volt limits, e.g., a pair of type 1N4737A's |
| 119 | 10 megohm resistor |
| 121 | 0.26 microfarad capacitor |
| 123 | *Type 3195/15 operational amplifier |
| 125 | 100K ohm variable potentiometer |
| 127 | 10K ohm resistor |
| 129 | 10K ohm resistor |
| 131 | 1K ohm variable potentiometer |
| 133 | *Type 4098/25 operational amplifier |
| 135 | 1K ohm variable potentiometer |
| 137 | 10K ohm resistor |
| 139 | 10K ohm resistor |
| 141 | 10K ohm resistor |
| 143 | 10K ohm resistor |
| 145 | 1K ohm variable potentiometer |
| 147 | *Type 4098/25 operational amplifier |
| 149 | 1K ohm variable potentiometer |
| 151 | 10K ohm resistor |
| 153 | 10K ohm resistor |
| 155 | 10K ohm resistor |
| 157 | 10K ohm resistor |
| 159 | 0.01 microfarad capacitor |
| 161 | 100K ohm resistor |
| 163 | *Type 3005/15 operational amplifier |
| 165 | 2K ohm variable potentiometer |
| 167 | 0.01 microfarad capacitor |
| 169 | 10K ohm resistor |
| 171 | *Type 3005/15 operational amplifier |
| 173 | 2K ohm variable potentiometer |
| 175 | 10K ohm resistor |
| 177 | 4 microfarad capacitor |
| 179 | *Type 4098/25 operational amplifier |
| 181 | 10K ohm resistor |
| 183 | 1K ohm variable potentiometer |
| 185 | 10K ohm resistor |
| 187 | 10K ohm resistor |
| 189 | *Type 3005/15 operational amplifier |
| 191 | 20Kohm variable potentiometer |
| 193 | 0.1170 ohm resistor |
| 200 | Make before break double pole single throw switch |
| 201 | 0.01 microfarad capacitor |

*As designated by Burr-Brown Research Corp., International Airport, Industrial Park, Tucson, Arizona 85706

In the embodiment of FIGS. 4 and 5, the direct current power supply requirements for the various active elements are ±15 volts and are indicated by an arrowhead with the appropriate sign.

Most of the major components of the apparatus schematically represented in FIGS. 4 and 5 will be recognizable from the foregoing discussion. As a starting point, it should be noted that a pair of amplifiers 133 and 147 are used to provide the output signal proportional to the capacitive component of leakage current and the compensated resistive component of leakage current respectively. Similarly, a pair of amplifiers 163 and 171 which are multiplicative operational amplifiers provide outputs which are proportional to vars and watts respectively. In the circuit of FIG. 2 but a single multiplicative operational amplifier 59 was provided to perform a dual function depending upon the position of the switch 49, however, it should be noted that there is no element in FIGS. 4 and 5 which performs the switching function of the switch 49 of FIG. 2 but rather the duplication of multiplicative operational amplifiers provides both outputs (vars and watts) simultaneously. Note also that the voltage applied to the stator being tested is supplied to both operational amplifiers 123 and 147. Furthermore, the fixed voltage source 47 of FIG. 2 has been replaced with a means for varying the test voltage which is illustrated as a variable output autotransformer, e.g., like those marketed under the trademark "VOLT-PAC" transformer by Specialty Transformer Department, General Electric Company, Fort Wayne, Indiana.

The circuit of FIGS. 4 and 5 contains a large number of passive circuit elements the function of which will be understood by persons skilled in the art and which have been shown only for the sake of completeness of illustration. Thus, for example, the arrowheads and associated signs represent connection to the positive and negative sides of a DC source. Fixed or variable resistors supply the appropriate DC balance control, gain adjustment and appropriate biasing to the several modules involved. The pairs of Zener diodes 93 and 117 are provided to prevent latch up of their associated operational amplifiers. Without these Zener diodes, it is possible under some circumstances for the amplifiers to provide a sufficiently strong output that the feedback circuit causes the amplifier to go into saturation and be no longer responsive to the input signal. A substitute variable resistance 87 such as a "decade box" may be provided and the system initially calibrated using the sample of the conductive liquid contained in the conductivity cell or fluid sample container 14 by setting switch 200 so that the cell 14 is in the circuit. Then, once the system is calibrated, the switch 200 is set to the position shown in FIG. 4, and a resistance equal to that previously established with the cell 14 in the circuit is "dialed into" the variable resistor 87. This is desirable because in some use situations the sample in tank or container 14 may experience some polarization and drift in its resistance after prolonged usage. The switch 200 is preferably a make before break double pole single throw switch so that, during calibration, the cell 14 is connected into the circuit before disconnection of resistor 87.

In addition to the switch 200 used to substitute the resistor 87 for the liquid sample tank 14, several other switches are illustrated in the schematic diagram. For example, switch 23 which is a multiple position gang switch as shown in FIG. 1 could instead be two mechanically separate switches, one of which is used to introduce the resistance 193 in series with the DF meter 25 to establish one scale factor as shown, or to by-pass that resistance and give a different scale factor for the meter 25. In practice, this scale factor is 10:1. Another section of the switch 23 or a separate switch provides a calibrating function when connected to the resistor 85. The resistor 85 has a resistance appropriate to provide a one milliampere current flow when the system is properly calibrated. A further switch 21 which was identified as a test switch in reference to FIG. 1 allows a resistance 81 to be inserted in series with the ammeter 19 during the initial portions of the calibrating operation to insure that the meter 19 is not over driven and damaged. The input voltage to be supplied to the stator under test is, of course, supplied by the variable output autotransformer 37 and in the preferred embodiment, the control is set to provide a 25 volt rms sine wave to the circuit.

During operation, the circuit of FIGS. 4 and 5 behaves such that both the resistive and the capacitive component of leakage current are provided simultaneously and their quotient formed by the operational amplifier 179 to provide a direct reading system rather than a system such as that illustrated in FIGS. 2 and 3 where some calculation is required to obtain the utlimate test information. A conductive connection to the surface of the insulation on the winding being tested is provided by immersing that winding in the conductive liquid contained in tank 11 to which a test lead 13 is attached. A second test lead 15 is connected to the winding conductor so that a voltage may be applied between the conductive connection and the conductor. Two distinct components of the resulting current flowing between this conductive connection and the conductor are determined.

The process of determining these components is to obtain a signal indicative of the applied voltage by way of operational amplifier 111, which signal is supplied to amplifiers 123 and 147; a signal indicative of the total leakage current by way of operational amplifier 105 which is supplied to amplifier 133 for use in determining the capacitive component of the total leakage current; and a signal indicative of compensated total leakage current by way of operational amplifier 99 which is supplied to amplifier 147 for use in determining the resistive component of the compensated total leakage current. Dealing first with the capacitive component of leakage current, a signal substantially 90° out of phase with the applied voltage signal is derived from the phase shift amplifier 123 and this shifted signal is multiplied by the signal indicative of the total leakage current in multiplicative operational amplifier 133. This product is then integrated by operational amplifier 163 and the result supplied to one input (the denominator input) of a quotient forming operational amplifier 179. The other input to this operational amplifier 179 (the numerator input) is obtained by forming the product in operational amplifier 147 of the signal indicative of the applied voltage from amplifier 111 and the signal from operational amplifier 99 which is indicative of the compensated leakage current (corrected for the resistive effect of the liquid in cell 14). The output signal of amplifier 147 is integrated by operational amplifier 171 and then supplied to the denominator input of the quotient forming amplifier 179. The output of operational amplifier 179 is passed through a final stage of amplification in the amplifier 189 which serves to smooth out any remaining ripples in the signal and to drive the meter 25. Amplifier 179 thus provides a signal indicative of the dissipation factor for the winding inserted between leads 15 and 13, and the amplifier 189 drives the DF meter 25 which may be so calibrated as to read directly the DF ratio $1/R_s C_s w$.

As noted earlier, the present invention provides a quantitative rather than qualitative measure of insulation integrity. Thus, the DF is the ratio of the resistive to the capacitive component of leakage current. The resistive component of leakage current would be at least approximately given by $I_R = e/(\rho t/A_b)$ where e is the applied voltage, $\rho$ is the resistivity of the liquid, $t$ is the average thickness of the insulation (which is the same as the thickness of the liquid which has filled a particular break in the insulation), and $A_b$ is the exposed surface area of the conductor because of the breaks in the insulation. Similarly, the capacitive component of current may be approximated by $I_c = weKA_t/t$ where w equals $2\pi$ times the applied frequency, e is the applied voltage, K is a constant for the particular insulating material and is related to its dielectric constant, $A_t$ is the total surface area of insulation in contact with the liquid and t is the average thickness of the insulation. The quotient or dissipation factor is then given by $DF = (1/PKw) \times (A_b/A_t)$. It will thus be understood that the quantitative ratio, or dissipation factor, is proportional to the ratio of the exposed surface area of the conductor to the total area of the insulation.

From the foregoing description and disclosed practice of the invention in a preferred form, it will be appreciated that I have provided methods and apparatus for quantitatively evaluating the integrity of an insulation coating on a winding conductor as well as the beneficial or adverse affect on a winding insulation coating by reason of various manufacturing practices and equipment to which the winding is subjected.

To be more specific, in one investigation, twenty separate windings were developed on a piece of conventional winding equipment and of these, 15 windings were assembled with a stator core then evaluated as described above, while the other five windings were each evaluated immediately after the winding step.

The dissipation factor for the 5 windings averaged 0.189, while the average dissipation factor for the 15 windings after assembly was 0.548. This indicated that the equipment and process utilized in assembling the windings on the stator cores had damaged the winding insulation. More importantly, however, this information can now be used to evaluate the quality of repaired or new equipment by comparing the "DF" of windings processed on such equipment with the "DF" of windings processed on equipment that experience has shown to be satisfactory vis-a-vis winding insulation damage.

In other investigations, I have found that the determination of the capacitive component of leakage current, measured while a winding is submerged, and determined with equipment embodying the circuit of either FIG. 2 or FIG. 4 may be utilized to advantage. For example, when evaluating the effectiveness or consistency of a winding treatment step such as one where varnish has been applied to the windings for insulation or bonding purposes, the change in the capacitive component of leakage current, when considered by itself, may be effectively utilized as an indicia of treatment effectives.

Still other applications should also be apparent to persons skilled in the art and thus, while I have described specific applications and have illustrated and described a preferred exemplification of my invention, it will also be apparent that many modifications may be made thereto. It is to be understood therefore that it is intended by the appended claims to cover all modifications that come within the spirit and scope of this invention.

What I claim as new and desire to secure by Letters Patent of the United States is:

1. A method of quantitatively evaluating the integrity of insulation on an insulated conductor, the method including the steps of: submerging at least part of the insulated conductor in a conductive fluid disposed within a first container; applying a voltage across the conductor and the conductive fluid; and developing at least two distinct electric signals with one of said signals indicative of capacitive current flow between the conductive fluid and insulated portions of the conductor, and with another of said electrical signals indicative of resistive current flow directly between the conductive fluid and uninsulated portions of the conductor exposed to and in direct contact with the conductive fluid.

2. The method of claim 1 further comprising the steps of: providing a second container with a sample of substantially the same conductive fluid as the conductive fluid in the first container; developing a compensating signal related to the conductivity of the sample of fluid; and utilizing the compensating signal while developing at least one of the two distinct electrical signals.

3. The method of claim 1 further comprising the step of forming a ratio of the signals related to the capacitive and resistive components of current flowing between the connections thereby to establish a factor that is a quantitative indicator of the quality of the insulation.

4. A method of evaluating the integrity of an insulation coating supported on an electrical conductor, the method comprising: surrounding the conductor with a conductive fluid; applying a voltage across the fluid and conductor; and providing at least a proportional indication in of the total surface area of insulation in communication with the fluid by determining the capacitive component of leakage current flowing through the conductor.

5. A method of quantitatively evaluating the integrity of insulation supported on an electrical conductor, the method comprising: disposing the electrical conductor in a conductive medium; applying a voltage across the conductor and the medium; deriving a first signal at least proportionally indicative of the total surface area of insulation on the conductor and in communication with the conductive medium; and deriving a second signal at least proportionally indicative of the total uninsulated area of the conductor that is in communication with the conductive medium.

6. The method of claim 5 further comprising forming a ratio of the first and second signals thereby to establish a dissipation factor representing a quantitative evaluation of the integrity of the insulation on the conductor.

7. An improved apparatus for use in determining the integrity of insulation supported on a winding conductor comprising: first connection means for establishing an electrical interconnection with at least selected portions of the surface of the insulation; second connection means for establishing an electrical interconnection with the winding conductor; means for applying a voltage across said first and second connection means; first circuit means for providing a first signal related to the capacitive leakage current flowing between the winding conductor and said first connection means; second circuit means for providing a second signal indicative of the applied voltage; and third circuit means for combining the two signals to provide a third signal indicative of the reactive power supplied to the winding conductor.

8. The apparatus of claim 7 further comprising means for selectively introducing a phase shift in the second signal indicative of the applied voltage.

9. The apparatus of claim 7 wherein said first connection means includes an electrically conductive fluid contacting the insulation and the second connection means comprises termination means for interconnecting the means for applying a voltage and the winding conductor.

10. Apparatus for providing a signal indicative of the insulating integrity of an insulation coating formed on an electrical conductor comprising: connection means for establishing an electrical interconnection with at least selected portions of the surface of the insulation coating; means for applying a voltage across the electrical conductor and said connection means; first circuit means for providing a first signal related to the current flowing between the electrical conductor and said connection means; second circuit means for providing a second signal related to the voltage applied across the electrical conductor and connection means; third circuit means for providing a third signal out of phase with said second signal; fourth circuit means for combining the first signal and the second signal to provide a first combined signal related to the active power supplied through the conductor; fifth circuit means for combining the first signal and the third signal to provide a second combined signal related to the reactive power supplied through the conductor; and sixth circuit means for combining the first and second combined signals to inter-relate the reactive power and active power supplied through the conductor, thereby to provide a signal indicative of the insulating integrity of the insulation coating on the electrical conductor.

* * * * *